May 6, 1958 W. KADEN ET AL 2,833,189
PHOTOGRAPHIC CAMERA WITH A JOINT MOTION OPERATOR
FOR TRANSPORTING THE FILM TENSIONING
OF THE SHUTTER
Filed Nov. 12, 1953 2 Sheets-Sheet 2

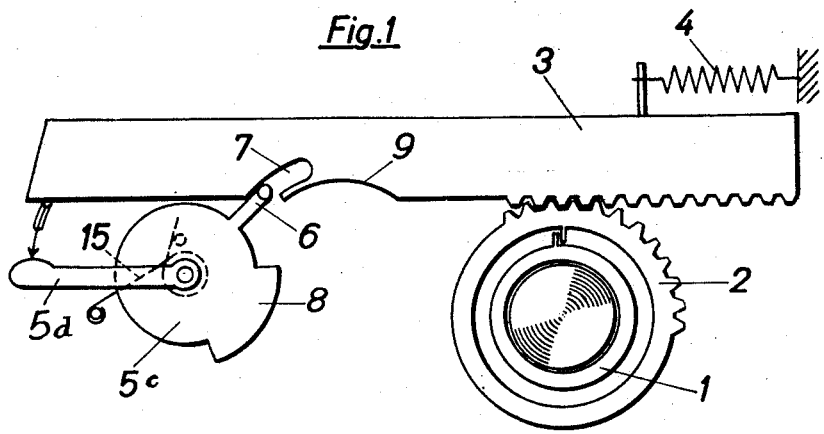
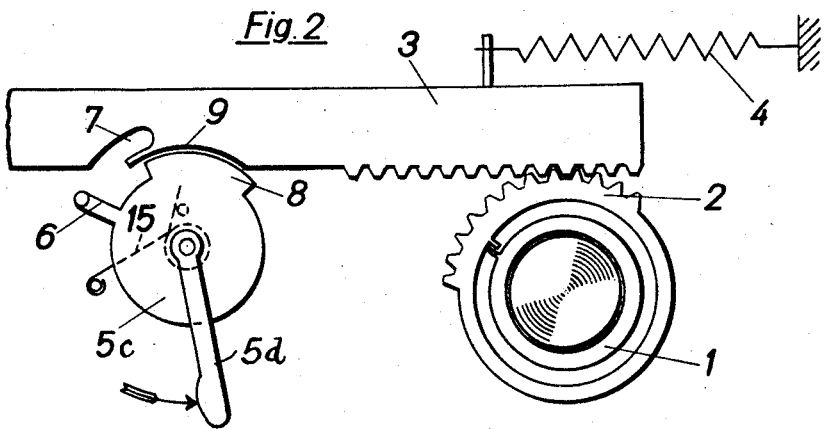
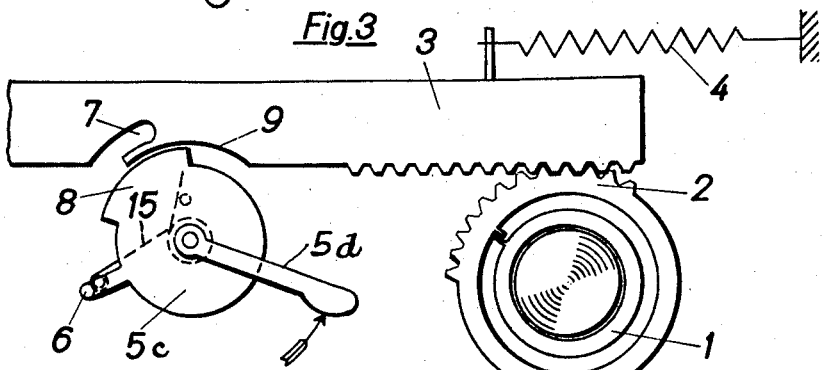

INVENTORS
WILLY KADEN and
ALFRED WINKLER

By Connolly & Hutz

THEIR ATTORNEYS

United States Patent Office 2,833,189
Patented May 6, 1958

2,833,189

PHOTOGRAPHIC CAMERA WITH A JOINT MOTION OPERATOR FOR TRANSPORTING THE FILM AND TENSIONING OF THE SHUTTER

Willy Kaden and Alfred Winkler, Munich, Germany, assignors to AGFA Aktiengesellschaft, Leverkusen-Bayerwerk, Germany, a corporation of Germany Application November 12, 1953, Serial No. 391,664

Claims priority, application Germany November 25, 1952

7 Claims. (Cl. 95—31)

This invention relates to photographic cameras and more particularly to the type camera employing automatic means for tensioning the shutter mechanism conjointly with the winding of the film. More specifically, the invention relates to an improved transmission linkage interconnected between the film transporting mechanism and the shutter tensioning mechanism in such manner as to automatically tension the shutter and retain the same in tensioned position during the winding of the film.

The purpose of this invention is to provide a photographic camera having a film transporting device coupled with the shutter setter in such a way that while winding the film, the photographic shutter is lifted automatically to its tensioned position and retained there while the winding of the film continues. Cameras equipped with such devices are known; however, difficulties are encountered if a variable or changing control passage or power track is chosen for locating the coupling mechanism between the film transporting device and the shutter setter, i. e. in adjusting the location of the shutter setter coupling mechanism to the film transport passage which, on account of the changing spool circumference, is flexible. For this purpose release clutches and shifting bouncers have been created in the past. Such clutches have the disadvantage that the power track between the film transporting device and the shutter is interrupted when the first part of the joint motion, i. e. the tensioning of the shutter, is completed.

Accordingly, a primary object of the invention is to provide a simplified transmission linkage which is positively and constantly interconnected between the shutter setter mechanism and the film transporting mechanism at all times. A further object of the invention is the provision of such transmission type linkage structure including means of an interlocking nature preventing premature initiation of the shutter closing action before completion of the film transporting movement. Other distinct objects will become apparent from the description and the claims which follows.

Therefore, according to the invention it is suggested that for a camera equipped with a variable film feed passageway or track between the film transporting device and the shutter setter, all the parts which are necessary for the utilization of these devices are maintained in a predetermined interlocked condition. The interconnection between the transporting device and the shutter setter can take place either by a Geneva movement which arrests the shutter setter device after the tensioning movement has been completed and keeps it in tensioned position until the film transporting movement has been completed, or it can be accomplished by a pin and slot connection between the film motion operator and a switch rod connected to the shutter setter.

Without altering the basic idea of the invention it is also possible to accomplish the interlocking connection between the film transporting device and the shutter setter by an independent catch lock device. In this case a pivoted catch member is supported by the camera casing and is equipped with a slanting cam surface which can be actuated by means of a pin carried on the film motion operator to lock the switch bar or rod in shutter tensioned position. This catch has a tooth for entering into a notch on the switch rod of the shutter and arrests it after the shutter tensioning movement has been completed.

In addition to the great advantage that the invention provides an uninterrupted, interlocked power track between the parts which accomplish the transporting of the film and those effecting the tensioning of the shutter, the arrangement offers the advantage of creating, particularly with respect to the rapid tensioning systems presently used on miniature cameras, a simplified structural system which can be located in various positions of relatively confined spacial extent.

Having broadly disclosed the invention reference will now be made to the drawings illustrating exemplified embodiments of the invention and in which:

Figure 1 shows one form of the interlocked connecting means of the invention at the beginning of the shutter tensioning operation;

Figure 2 shows the device of Figure 1 after completion of the shutter tensioning movement;

Figure 3 shows the device of Figure 1 after the completed shutter tensioning but before completion of the film winding movement;

Figure 4:
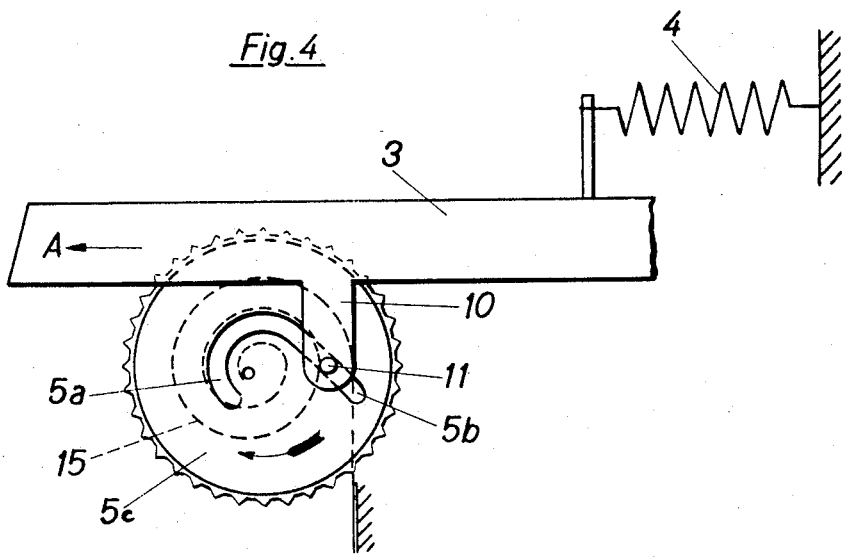
Figure 4 shows another embodiment of the invention in the form of a pin and slot connection with a concentric curvature.

A preferred embodiment of the invention is illustrated in Figures 1 through 3, inclusive, of the drawings in which the shutter setter mechanism is illustrated at 1 and the motive means for transporting the film is illustrated at 5c. In each case the mechanism comprises a rotatable member, the member 5c being an manually actuated disc. In order to synchronously wind the film upon actuation of disc 5c and tension the shutter 1, a unitary translating rack member 3 is positioned for reciprocal movement adjacent said members and comprises an interconnecting link or switch bar. The bar is provided with rack teeth on its inner peripheral surface and which are adapted to mate with a toothed segment 2 carried on the shutter mechanism 1. A spring member 4 is connected between a stationary part of the camera and bar 3 for urging the switch bar to the right as viewed in the figure. Spring 4 thus tends to maintain shutter member 1 in its shutter closed position.

Switch bar 3 is also provided along its inner peripheral surface, at points spaced from the rack teeth, with an arcuate recessed area 9 and an adjacent arcuate groove 7. Groove 7 and recessed area 9 are adapted to cooperate with the actuating member 5c of the film transport motive means to reciprocate the switch bar 3 from its untensioned position to a position in which the shutters are fully lifted during a portion of the film transporting movement. For this purpose the disc 5c is provided with a raised arcuate cam surface 8 and a projecting finger member and integral pin 6 which are adapted to cooperate, respectively, with the recessed area 9 and groove 7 on the switch bar.

The arrangement is such that upon completion of one photographing operation, the finger and attached pin 6 on disc 5c are disposed in the entrance of arcuate slot 7 in the manner indicated in Figure 1. Thereafter, actuation of disc 5c as by means of depressing lever arm 5d in the direction of the arrow (Figure 1) causes the rack bar to move against the action of spring 4 and reciprocate from right to left. As this action occurs the toothed segment 2 and the shutter mechanism will be rotated to a fully tensioned position (as illustrated in Figure 2). During this movement the raised cam surface 8 on disc 5c will enter and meet with the recessed area 9 without interfering with continued rotation of disc 5c.

However, further rotation of the disc 5c will cause finger member 6 to become disengaged from groove 7 and in the absence of a retaining or braking means would permit rack bar 3 to move to the right under the action of spring 4 at a time when the film transporting action had not been completed. This is avoided according to the present invention by reason of the raised cam 8 and recessed areaway 9 which together with slot 7 and finger 6 function as a Geneva movement preventing movement of rack bar 3 upon engagement of cam 8 in areaway 9 while at the same time permitting continued rotation of member 5c.

As shown in Figure 3, the rotating member 5c may revolve in the direction of the arrow for substantially 270° before cam 8 leaves recess 9 at which time the film transporting movement has been completed to position a new frame behind the lens diaphram. At such time the switch bar 3 is freed from the influence of disc 5 and may reciprocate to the right, as viewed in the figure, under the effect of spring 4. In some instances such movement may of itself be utilized to release the tensioned shutters and to snap the picture.

A modified form of the invention is illustrated in Figure 4 of the drawings in which the Geneva movement has been replaced by a simple pin and slot connection. As shown, the disc 5c includes a slanting slot 5b which terminates in a curved slot concentric with the center of disc 5c. The switch bar 3 which includes rack teeth (not illustrated) for cooperation with a shutter mechanism in a manner identical with respect to Figures 1 through 3, inclusive, includes a depending arm 10 supporting a laterally projecting pin 11. The pin 11 is engaged in slot 5b and interconnects the rack bar for movement from right to left, as viewed in the figure, upon actuation of the disc 5c in the direction of the arrow.

As will be readily understood from an inspection of the drawing the winding movement of disc 5c causes pin 11 to become cammed in the direction of the arrow A by reason of its contacting the edge of the slanting slot 5b. Such translation of rack bar 3 serves to tension the shutter mechanism in the manner previously described. Thereafter, completion of the film transporting movement is facilitated without permitting rack bar 3 to return to its initial position by the entrance of pin 11 into the concentric curvature 5a of the slot. After completion of the film transporting movement the disc may be released and returned to its initial position under the effect of a spring 15, the disc 5c for this purpose being connected to the film reeling mechanism by means of a known one-way clutch structure (not illustrated). Release of disc 5 also permits rack 3 to return to its initial position under the effect of spring 4.

Figure 5:
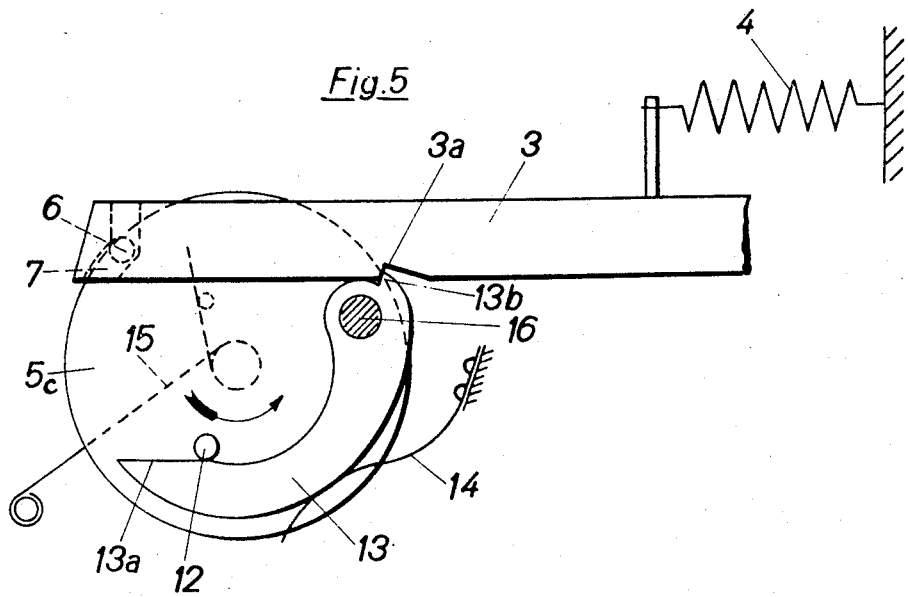
Figure 5 shows another embodiment of an interlocking connection in the form of a catch lock device.

A still further modified form of the invention is illustrated in Figure 5 of the drawing in which an independently supported catch lock device is utilized to lock the switch bar in its tensioned position during completion of the film transporting movement. In this form of the invention the switch bar 3 is again connected to the film transporting disc 5c by means of a pin and slot connection 6, 7, the pin being supported on the disc and the slot being formed in the end of bar 3. The arrangement is such that rotation of disc 5c in the direction of the arrow serves to selectively engage pin 6 in slot 7 when bar 3 is in its untensioned position (i. e. when the bar has moved to the right as viewed in the Figure 1. This will reciprocate the bar during a substantial portion of the arcuate travel of disc 5c to tension the shutter mechanism in the manner hereinbefore indicated until pin 6 reaches a position slightly beyond that illustrated in Figure 5. At such time pin 6 will become disengaged from slot 7 during the remainder of the rotary movement of disc 5c.

In accordance with this form of the invention, however, a second pin 12 is mounted on disc 5c and so spaced from pin 6 as to contact the slanting periphery 13a of a curved latch member 13 supported independently of disc 5c as by means of a pivot pin 16 extending from the camera casing. The pivoted latch arm or catch 13 is normally biased in a clockwise direction in such manner as to project the slanting end 13a of the catch towards the center of disc 5c by reason of a leaf spring 14 mounted on the camera casing structure. Catch 13 also includes a projection 13b adjacent its pivotal axis and which is adapted to become engaged in a notched recess 3a in bar 3.

The arrangement is such that upon completion of the shutter tensioning movement, and as pin 6 is leaving slot 7, the second pin 12 engages the slanting surface 13a of catch 13 to pivot the catch 13 against the bias of spring 14 and engage projection 13b in notch 3a on bar 3. Thereafter, continued rotation of disc 5c to complete the film transporting movement may proceed with pin 12 in contact with the curved periphery of catch 13 to maintain the catch and its projection 13b in contact with rack bar 3. Upon completion of the film transporting movement the pin 12 has traversed the arcuate extent of lever 13 and becomes disengaged therefrom in the region of the pivot pin 16 to permit spring 14 to rock said lever in a clockwise direction and disengage projection 13b from notch 3a. This action is accompanied by reciprocation of bar 3 to the right under the effect of spring 4 and at the same time by the return of disc 5c in a clockwise direction under the effect of spring 15.

A particular feature of the present invention is the provision of connecting means between the shutter setter mechanism and the film transporting mechanism which will interlock the two so as to positively prevent unintended release of the shutter mechanism prior to completion of the film winding operation. Another advantage of the invention is the obtaining of such result in accordance with the present teachings by reason of various and simplified structures including means permitting a lost motion type movement of the film transporting mechanism while retaining the shutter tensioning connection in a stable condition. It will be appreciated that the interlocking connections described in the several embodiments illustrated may be duplicated by equivalent structures. In this respect it will be understood that in some instances the film transporting motive means in the form of a disc similar to the disc 5c in the several examples heretofore disclosed, may comprise a Geneva wheel of the star type in which a single revolution of the wheel would serve to selectively engage separate operating arms and arresting cams with a rack bar similar to that of Figure 1 while providing for the complete unwinding of a single roll of film by the single rotation of the disc.

As many widely different embodiments of this invention may be made without departing from the spirit and scope hereof, it is to be understood that the invention is not limited to the specific embodiments hereof except as defined in the appended claims.

What is claimed is:

1. A photographic camera comprising a shutter tensioning mechanism and a film-winding mechanism with the shutter being tensioned during a first portion of the film-winding operation, an operating means connected to said film-winding mechanism, movable coupling means operatively connecting said operating means with said shutter-tensioning mechanism to provide a period of simultaneous operation of said film-winding and shutter-tensioning mechanisms, open-ended slot and pin means for interconnecting said operating means and said coupling means to move said coupling means to a shutter setting position during a first portion of movement of said film-winding mechanism, interlocking means operatively associating said operating means and said movable coupling means for maintaining said movable coupling means in said shutter-setting position while said pin moves out of engagement with said slot as said operating means completes its film-winding movement, and said operating and interlocking means being constructed and arranged to release said movable coupling means after said film-winding movement has been completed.

2. A photographic camera as set forth in claim 1 wherein said movable coupling means is comprised of a bar including a rack and said shutter-tensioning mechanism includes a toothed segment operatively engaged with said rack.

3. A photographic camera as set forth in claim 1 wherein said movable coupling means is comprised of a bar, said operating means being a rotatable disk, said pin being mounted upon said rotatable disk, said bar including said slot, said disk having a raised arcuate segment, and said bar including a recess for receiving said segment to provide said interlocking means.

4. A photographic camera as set forth in claim 3 wherein a spring is connected to said bar for resiliently urging said bar towards its original position.

5. A photographic camera as set forth in claim 4 wherein said pin is mounted upon a finger extending outwardly from said disk.

6. A photographic camera as set forth in claim 1 wherein said interlocking means includes a rotatably mounted arm, said arm including a projection, said movable coupling means including a notch for receiving said projection, a second pin mounted upon said operating means for contacting said arm during said first portion of said film-winding operation prior to disengagement of said first mentioned pin with said slot to cause said projection to engage said notch to maintain said movable coupling means in said shutter setting position while said pin is out of engagement with said slot, and said second pin and said arm being constructed and arranged to allow said projection to move free of said notch to release said coupling means after said film-winding movement of said operating means has been completed.

7. A photographic camera as set forth in claim 6 wherein a second spring is operatively engaged with said arm to resiliently urge it in a direction to maintain it in contact with said second pin and to move said projection out of engagement with said notch.

References Cited in the file of this patent

UNITED STATES PATENTS

| | | |
|---|---|---|
| 2,028,752 | Burger | Jan. 28, 1936 |
| 2,150,642 | Wachtler | Mar. 14, 1939 |
| 2,315,279 | Simmon | Mar. 30, 1943 |
| 2,364,466 | Nagel | Dec. 5, 1944 |
| 2,386,575 | Simmon et al. | Oct. 9, 1945 |
| 2,395,828 | Kallusch | Mar. 5, 1946 |

FOREIGN PATENTS

| | | |
|---|---|---|
| 624,351 | Germany | Jan. 18, 1936 |
| 642,319 | Great Britain | Aug. 30, 1950 |